United States Patent [19]
Eversberg et al.

[11] 3,725,695
[45] Apr. 3, 1973

[54] ILLUMINATION DEVICE

[75] Inventors: Gerhard Eversberg, Ludenscheid; Heinz Seelbach, Kierspe, both of Germany

[73] Assignee: Firma Reininghaus & Co., Ludenscheid, Germany

[22] Filed: Oct. 27, 1971

[21] Appl. No.: 192,876

[30] Foreign Application Priority Data

Oct. 28, 1970 Germany................P 20 52 752.0

[52] U.S. Cl..............240/52 R, 174/99 B, 240/73 R, 240/78 R
[51] Int. Cl..........................H02g 7/00, F21v 21/34
[58] Field of Search........240/52 R, 52 HT, 61, 73 R, 240/73 DA, 73 JC, 78 R, 85 R; 339/21 R, 22 R, 22 T, 22 B, 14 R; 174/99

[56] References Cited

UNITED STATES PATENTS

| | | | |
|---|---|---|---|
| 3,559,146 | 1/1971 | Valtonen | 339/14 R |
| 3,601,748 | 8/1971 | Hart | 339/22 B X |
| 3,546,367 | 12/1970 | Hart | 174/99 B |
| 3,531,758 | 9/1970 | Blunkin | 174/99 B |
| 3,489,981 | 1/1970 | Corl et al. | 174/99 B |
| 3,422,387 | 1/1969 | Sprigings et al. | 339/21 R X |

FOREIGN PATENTS OR APPLICATIONS

| | | | |
|---|---|---|---|
| 957,128 | 5/1964 | Great Britain | 339/22 T |
| 482,329 | 1/1970 | Switzerland | 339/22 B |

Primary Examiner—Joseph F. Peters, Jr.
Attorney—Ernest G. Montague

[57] ABSTRACT

A lighting device, comprising a supporting rail defining a receiving channel in which are disposed conduit rail carriers. A plurality of electrical conduit rails are received in the conduit rail carriers. Three of the conduit rails constitute pole rails and one of the conduit rails constitutes a zero-conduit rail. A connection box is insertable into the supporting rail and is equipped with a plurality of spring holding- and contact-tongues switchable selectively by means of a switch into an engagement- and contact-position with one of the pole rails and into an inoperative position, respectively. An independent preselection switch is disposed between each individual pole contact tongue for the formation of an operating current circuit, and switchable from outside of the supporting rail, and is further equipped with switch contact points of a number corresponding with the number of pole rails on the side of the supporting rail and having an individual contact connection with one of the pole contact points, and a switch bridge on the inside of the preselection switch is connected with a light source by means of a current conduit, and the light source being disposed between the current feed on the pole side and the zero conduit.

7 Claims, 14 Drawing Figures

ILLUMINATION DEVICE

The present invention relates to a lighting contrivance comprising on the one hand, a supporting rail open to one side and supported in, on or at a distance from a securing face, which supporting rail receives inside thereof on both sides of a connecting box-receiving channel, a plurality of electrical conducting rails in a carrier for the conducting rails, the latter being disposed in planes in pairs and mirror image symmetry to a longitudinal center plane, extending from the insert side towards the securing side of the support rail and superposed relative to each other, and accessible from the inside, as well as forming a plurality of independently operating circuits. Three conduit rails constitute pole rails and one conduit rail constitutes a zero-conduit rail. On the other hand, the lighting contrivance comprises a connecting box insertable with a set-off head part into the inner space of the supporting rail and carrying lighting units. The connecting box is equipped with a plurality of spring-tongues constituting holding- and contact-tongues switchable selectively by means of a toggle-switch, and operable from the outside into an engagement- and contact-position with one of the pole rails or switchable into an inoperative position, as well as with a grounding tongue cooperating with an individual grounding rail.

A switching axle serves as a common structure element, the switching axle being operable from the outside by a toggle switch, which is designed such, that it is capable of, on the one hand, to change the contact-spring carriers with the contact springs disposed thereon selectively into a free position or a contact position with the electrical conduit rails, and, on the other hand, the same switching shaft serves the purpose, to switch, depending upon the switching positions, into contact engagement, one or the other contact spring tongue with one or the other electrical conduit rail of the multi-conduit-supporting rail, so that operating current-circuits are produced.

It is one object of the present invention to provide a lighting contrivance in connection with a multi-conduit-supporting rail which is structurally and functionally simplified and improved and beyond that increases its safety.

It is another object of the present invention to provide a lighting contrivance, wherein for the formation of an operating current circuit, a preselection switch is provided, which is, switchingly operable by means of a switching member outside of the supporting rail accessible from the outside of the connection box, and disposed structurally separate from the toggle switch to the switch element operation, as well as independently from the toggle switch as to operation and function, between each pole contact tongue received for crosswise guidance in groups in the connection box and a pole rail on the side of the supporting rail in the connection box. The preselection switch is equipped with switch-contact points of a number corresponding with the number of the pole rails on the side of the supporting rail and the switch contact each point having an individual contact connection to one of the pole contact tongues. Furthermore the switch bridge on the inner side of the switch having a current feeder is connected with a light source, which is disposed between this pole-sided current feeder and the zero-conduit.

A particularly decisive advantage of the present lighting contrivance resides in the separate arrangement and in the operation of the switching elements carrying the contact tongues operated independently from each other, on the one hand, and the selection of the operation current circuits between the pole contact tongues and the pole rails of the supporting rail, on the other hand. A particular advantage is added by the fact, that the preselection switch disposed, in accordance with the present invention, outside of the supporting rail and disposed separate from the switching shaft effecting the movement of the switching elements, is switched in its still unloaded state by the current flow, so that no overloading of individual pole rails can occur, which contributes decisively to the increase of safety and for protection of the apparatus.

With the circuits thus operating independently from each other, now the set connection boxes can be operated also timely independent from each other. As an example it should be mentioned here, that in case of use of such illuminations devices, for example, for decorative illumination in display windows or the like the connection boxes and the projection lights can be operated at predetermined, preselectable time periods, so that for example all those connection boxes, which are disposed in one circuit, can be switched off at the same time, while all connection boxes of two further circuits remain further in operation. Also from these two further circuits, one or also both circuits can be switched-on or-off at predetermined preselectable time periods. It is thus apparent that one has now a plurality of variation and application-possibilities with the lighting contrivance of the present invention within the framework of the circuits being independent from each other within a common supporting rail, which render thereby the present invention particularly effective and, which can be universally applied.

The handling of a connection box designed in accordance with the present invention is extremely simple, since one can determine at first prior to its insertion of the pole contact tongue in the connection box, by rotation of the preselection switch, which pole contact tongue is to form an operating circuit with one pole rail in the supporting rail, which feature is more clearly disclosed below in the detailed specification. If this preselection is performed, the connection box can be inserted with the supporting rail and can be secured by rotation on the switching lever in known manner. In spite of the fact, that then in the inserted end position all pole contact tongues, as well as the zero-conduit tongue, are in contact engagement with the pole rails as well as with a zero-conduit rail in the supporting tail, only one simple, preselected operating circuit prevails within the connection box. An operating circuit is formed, in accordance with the present invention, such, that the light source, in this case the projected light, is disposed between the zero-conduit feed and the current feed of a pole rail by means of a pole contact tongue, the switching bridge of the preselection switch and the conduit connection of the switching bridge to the light source.

Not only by the structural separation of the switching shaft moving the switching elements and of the preselection switch, but also by the operation of both elements independently from each other, the advantages, not obtained heretofor, are brought about with an improvement of the function and an increase of the safety.

Structurally, the present invention can find an advantageous development in a possible embodiment, wherein the base of the preselection switch has worked-in switching stays constituting the switching points, is united in an integral structure with a guide insert for the cross guide of the switching elements carrying pole contact tongues, which guide insert is inserted into one of the two housing cups of the connection box, whereby this guide insert jointly with a covering cap of the preselection switch on the inner side of the connection box are connected by two securing screws common to both with the housing cup.

With this possibility of the structure, the guide insert constitutes thus a multi-function structural element, which excells not only by its integral structure, but also by the provision of the required functional elements within the narrowest space, whereby the arrangement of the switch base and of the guides for the switching elements in superposed planes are to be seen as particularly advantageous and suitable.

In the embodiment of the guide insert it is further of advantage, that is has projecting from an insert bottom plate engaging the housing cup three guide wall parts disposed at the distance of the width of the switching elements of a height corresponding with the depth of the connection box, in which guide wall parts are worked in in opposite arrangement groove-like guides open at one side for the reception of guide ledges on the side of the switching elements.

It is further of importance for the structural embodiment of the present invention, that each switching element is formed substantially as a fork-shaped structure body, the head part of which is equipped with two open insert openings disposed adjacent to each other and extending substantially in longitudinal direction of the body for the reception of contact tongues, on one hand, and form by two projecting stays a further reception for a holding tongue, on the other hand, while the fork-like foot part of the body grips over sitting straddlingly a control eccentrix provided on the shaft of the toggle switch for operation of the switching elements.

Thus it has been achieved, to provide all spring tongues required for the holding of the connection box in the supporting rail, as well as for the contact transmission with recognition of the required safety-distances in proper manner in the narrowest space, so that no voluminous structure is created. Also it is achieved, to receive protectingly in slot receptions the spring tongues serving the contact making on the preponderant part of their length. The fork-shaped design of the foot part of each switching element makes superfluous, in addition, particular bearings for the support of the eccentrix of the switching shaft for the operation of the switching elements, so that they constitute thereby simplest, yet absolutely effective structural elements.

Finally, within the framework of the present invention that two switching elements are provided in tandem in axial direction of the shaft of the toggle switch and are displacingly movable oppositely by oppositely disposed control eccentrices which are set off axially.

By this opposite, and axially set-off arrangement of the control eccentrices on the shaft of the switch operating the toggle switch, an opposite movement of the tandem-arranged switching elements is achieved, in order to transfer the spring tongues selectively into its freeing or contact position.

In summary, by the present invention it is made possible to create a lighting contrivance, which complies with all requirements completely with the highest safety from electrical points of view and it is thereby practically a technically finished, most useable solution and is furthermore a superior to all known devices of this type for the above mentioned reasons.

With these and other objects in view, which will become apparent in the following detailed description, the present invention, which is shown by example only, will be clearly understood in connection with the accompanying drawings, in which.

Referring now to the drawings, the lighting contrivance comprises three main parts, namely a supporting rail A, at least one connecting box B, as well as a projection lamp C. The supporting rail A can be secured by securing means, not described in detail on a securing face, for example in a suspended arrangement, and has inside, a connection box - reception chamber 10. In a lateral opposite arrangement to the reception chamber, electrical conduit rails, namely pole rails R, S and T and a zero-conduit rail Mp are provided in the supporting rail A in conduit rail carriers.

Each connection box B comprises two housing cups 11 and 12, which are connectable together by means of screws. It has a substantially parallelepipedon-like base shape and is formed at an end insertable into the hollow reception chamber 10 of the supporting rail, as a head part B' step-wise set off as to its width. Holding tongues 14 and 15, which cooperate with holding pockets, as well as contact tongues 16, 17 and 18, 19, respectively, are disposed in the connection box B itself. These resilient tongues are provided on switching elements E, which are displaceable crosswise in the connection box B, and are operable by means of a toggle switch 20 mounted on a switching shaft 21. In addition, a spring-biased grounding tongue 22, which cooperates with a grounding conduit rail 23 of the supporting rail A, is disposed in the connection box B.

Two switching elements E are disposed within the connection box in series in axial direction of the switching shaft 21 and are effective in the sense of cross-movement thereof in the connection box B by eccentrices 24 and 25 in opposite direction relative to each other, in that, by rotation of the toggle switch 20 in clockwise direction, the switching elements are moved such, that the contact spring tongues are brought into engagement with the supporting rail A. The switching element, which is adjacent the toggle switch, moves thereby on the drawing towards the left, while the switching element, which is remote from the toggle switch is moved towards the right. By rotation of the toggle switch counter-clockwise a return guide movement of both switching elements in the other direction is created.

Figure 9:
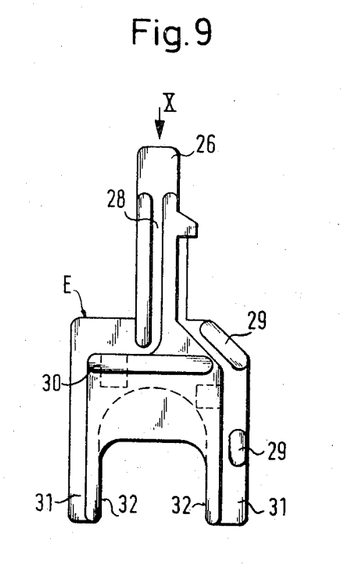
FIG. 9 is an end view of a switching element.
Figure 10:
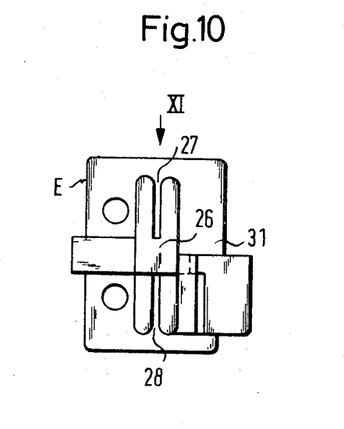
FIG. 10 is a top plan view of the switching element shown in FIG. 9.
Figure 11:
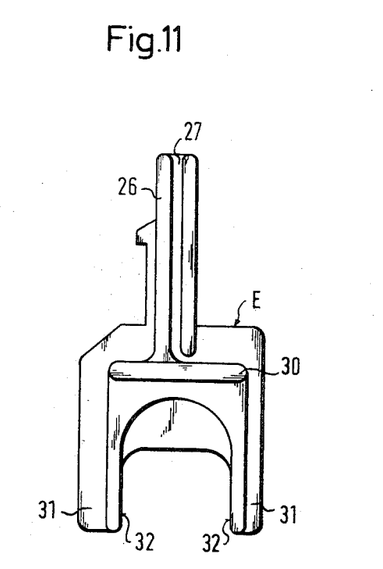
FIG. 11 is an end view of the switching element, shown 90° turned of the view in FIG. 9.

Each switching element E is designed substantially as a fork-shaped body, in the head part 26 of the latter in a side by side arrangement, open insert slots 27 and 28 for contact springs are provided. In addition, a holding tongue 14 and 15 can be received between the holders 29. This fork-shaped body E is equipped with guide ledges 30 laterally on oppositely-disposed locations, by means of which guide ledges a guide of the switching elements E is created in a guide-holder F. The foot-part 31 is designed as a fork, whereby a guide 32 is disposed between the fork-arms 31, with which guide 32 cooperates an eccentrix of the switching shaft 21.

Figure 7:
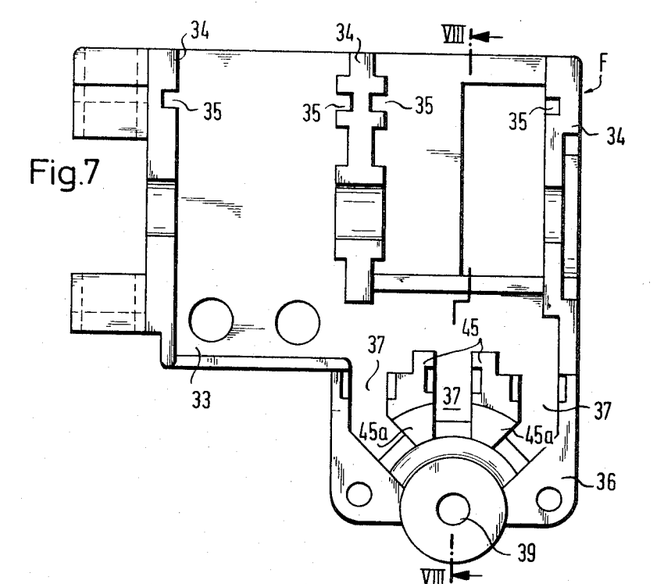
FIG. 7 is a top plan view of the guide insert.
Figure 8:
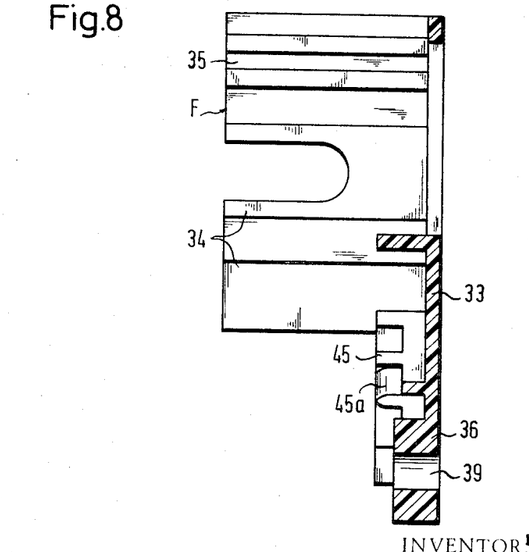
FIG. 8 is a section along the lines VIII—VIII of FIG. 7.

The guide-holder F has a bottom plate 33. Guide walls 34 are provided spaced apart from each other projecting relative to the bottom plate 33, guide grooves 35 being worked into the guide walls 34 in which guide grooves can be received the guide ledges 30 of the switching elements. The bottom plate 33 of the guide-holder is extended on one-side downwardly and forms a switching socket 36 and has fan shaped receiving zones or cavities 37 for the reception of electric contact points for the reception of contact-stays 38 constituting electrical contact points. In addition the socket forms a guide hub 39 for the reception of a switching shaft 40 of a switch, and a switching bridge 41, a switch covering cap 42 and a switch member 43. The switch covering cap 42 is retained jointly with the guide-holder F by joint securing screws 44 in the housing cup 11.

Figure 1:
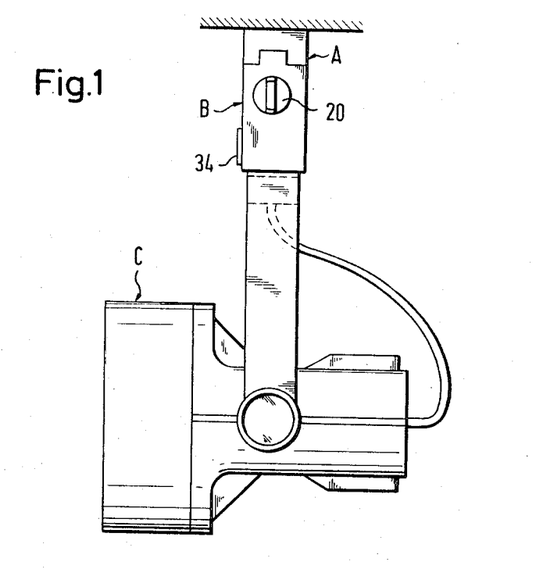
FIG. 1 is a front elevation of a lighting contrivance comprising of a supporting rail, a connection box and a projection lamp.
Figure 2:
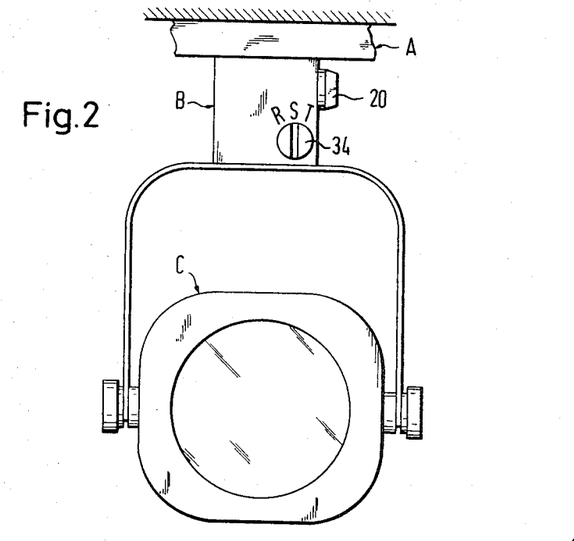
FIG. 2 is an end elevation of the device shown in a position rotated for 90° relative to the view of FIG. 1.
Figure 3:
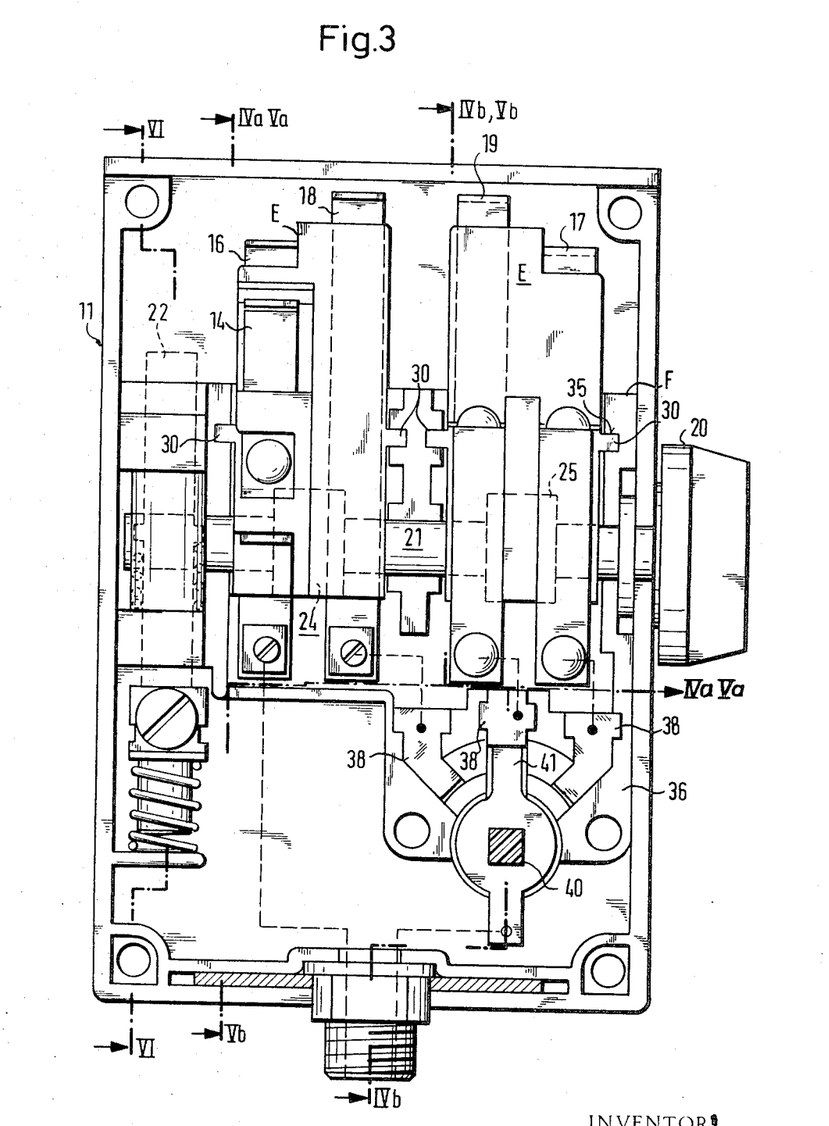
FIG. 3 is an elevation of the connection box, housing cup and a switch covering cap being removed for better demonstration.
Figures 4A, 4B:
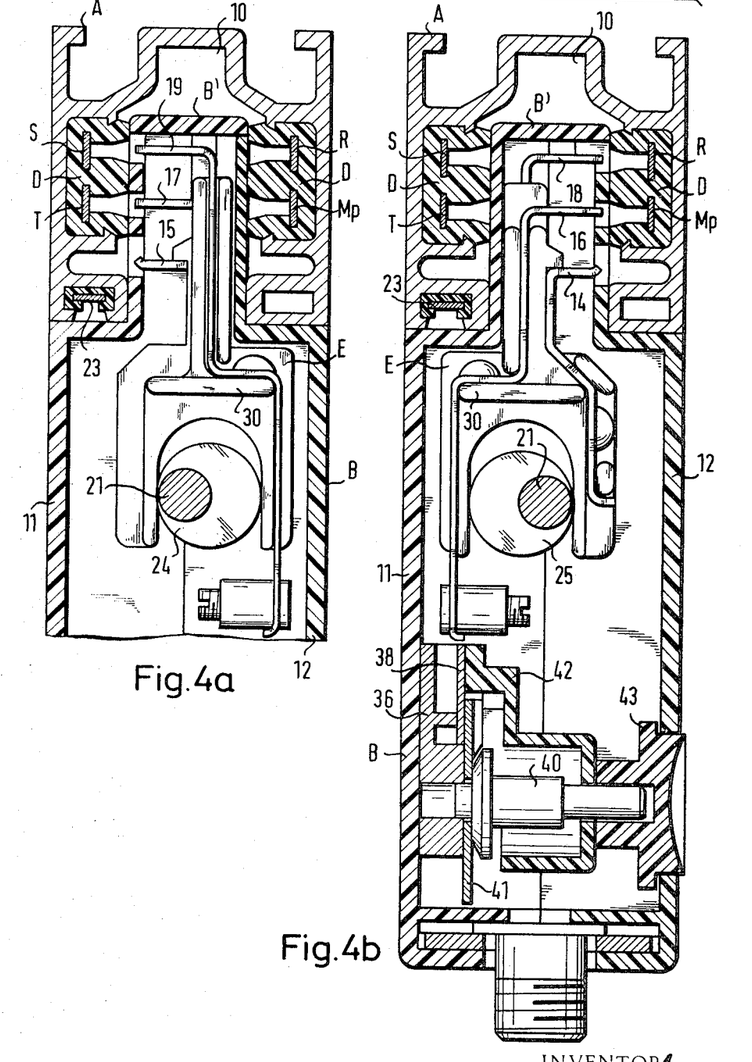
FIG. 4a is a section along the lines IVa—IVa of FIG. 3.
FIG. 4b is a section along the lines IVb—IVb of FIG. 3, the position of the switching elements in FIGS. 4a and 4b being shown in the insert portion of the connection box, though they are actually disposed in tandem in axial direction of the switching shaft, for a better showing.
Figure 12:
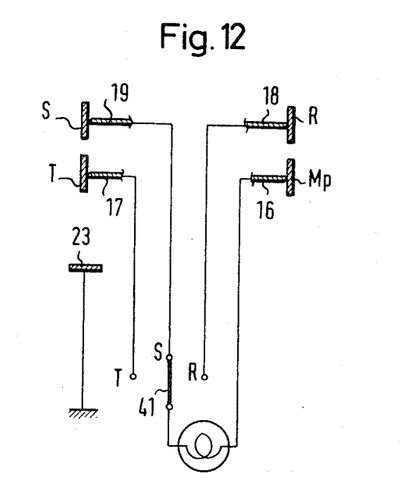
FIG. 12 is a circuit diagram of the lighting contrivance, designed in accordance with the present invention.

As is apparent in FIGS. 3 and 12, the individual pole contact springs 17, 18 and 19 are in electrical contact by means of a conduit connection with the contact stays 38 of the switch 38–43. The zero conduit contact tongue 16 has its own contact connection to the projection lamp C.

Figures 5, 5A, 5B:
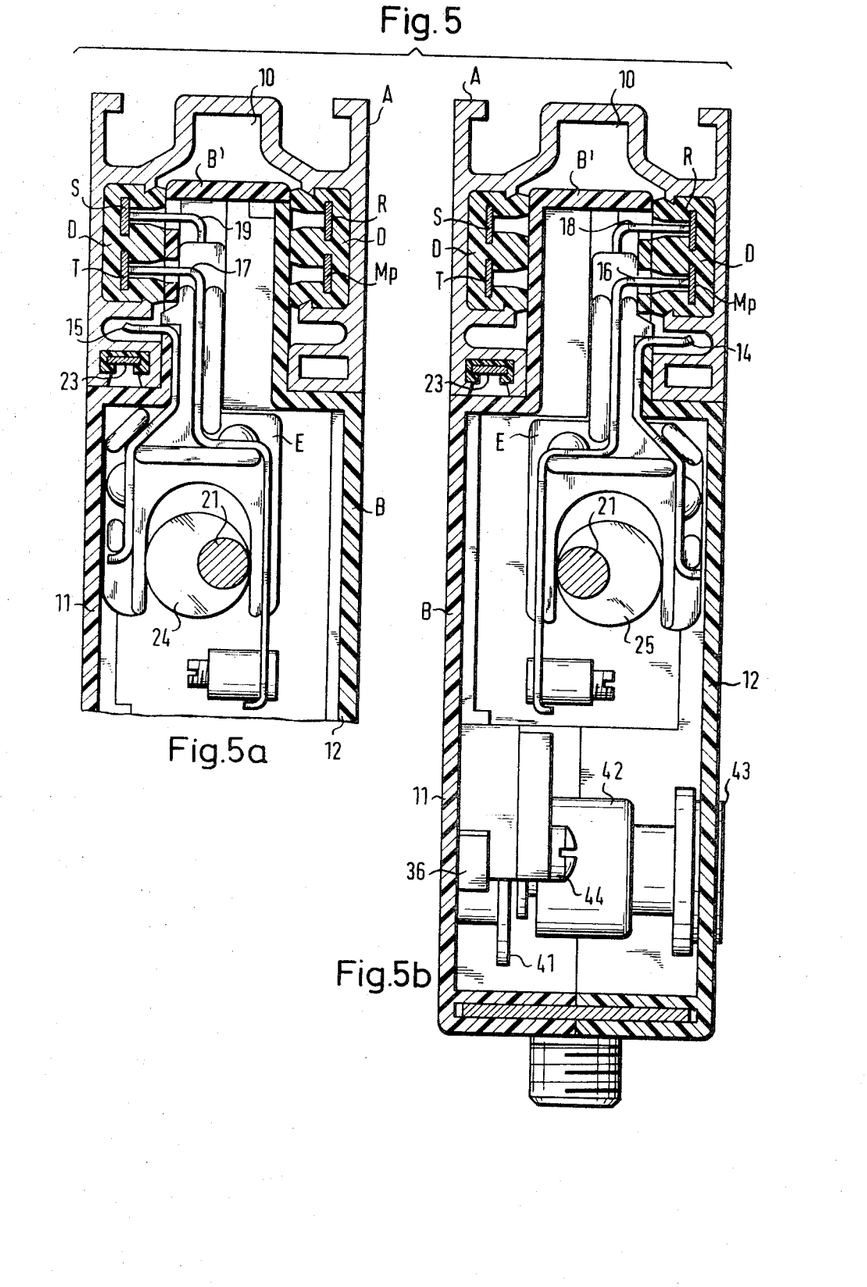
FIG. 5a is a section along the lines Va—Va of FIG. 3.
FIG. 5b is a section along the lines Vb—Vb of FIG. 3.
Figure 6:
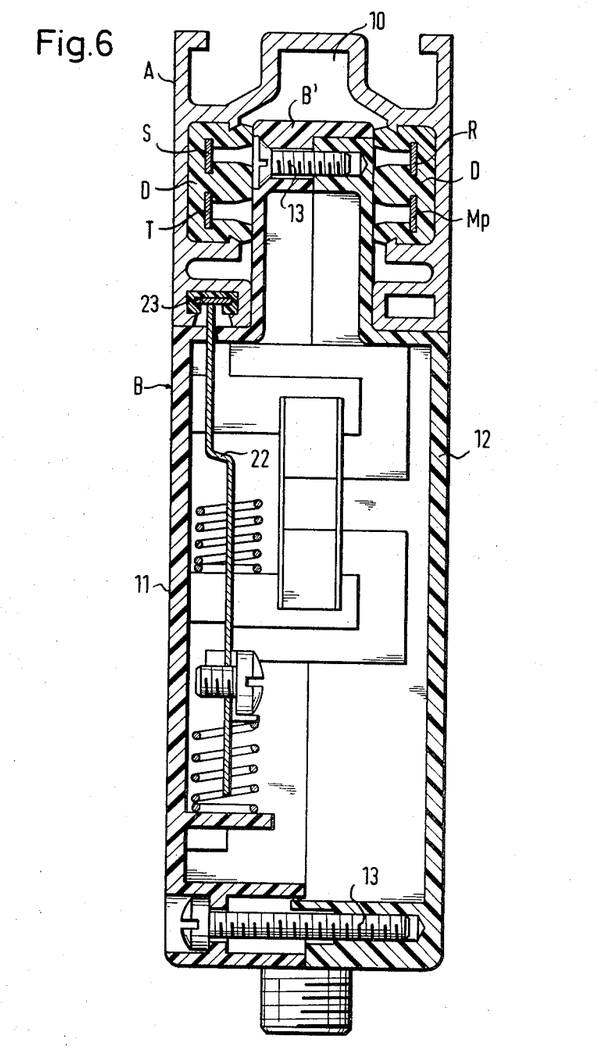
FIG. 6 is a section along the lines VI—VI of FIG. 3.

The operation of the present lighting contrivance is best understood in connection with the diagram of FIG. 12, which coincides with the switching position of the switch in accordance with FIG. 3. It is apparent therefrom, that the switch bridge 41 brings about a contact connection to the pole contact tongue 19, which in turn produces a contact connection with the pole rail S in accordance with FIG. 5, so that between the pole rail S and the pole contact tongue 19 by means of the switch bridge 41, in connection with the zero conduit Mp, an operating current circuit for the projection lamp is created.

In this manner also each other pole contact tongue can be brought into a current circuit capable of operation, whereby, however, the preselection of the current circuit, which is to be effective, is performed by switching of the switch prior to the insert of the connection box into the supporting rail A. Upon insertion then the mechanical movement of the switching elements E takes place.

It is considered also advantageous and suitable, within the framework of the present invention, that the switching stays 38 constituting the switch contact points are received in a fan-like arrangement in the socket part 36 in groove-like cavities 37, which are separated from each other by upright separation stays 45, ball-like curved over parts of their length within the swinging movement range of the switch bridge 41 and forming a slide-over bead for the contact end of the switch bridge, whereby the apex ranges of the slide-over beads 45a of the separation stays are disposed, set off in planes of different heights, above the switch stays.

This proposed arrangement brings about a clear separation with the maintenance of the safety spacings between the individual switching stays 38 and is effective in addition in a self-cleaning sense on the contact end of the switch bridge 41, which in case of the switching displacement, i.e., during the operation of the preselection switch, slides with friction with its contact side forcibly over the curved apex ranges and is thereby automatically held clean.

It is to be understood, that the shown and described embodiment is only a possible example for the practical realization of the present invention, without being limited thereto. Important and decisive is only the fact of the structural separation of the preselection switch from the switch shaft and the independence of its operation from the service of the switching elements over the switch shaft. Operating current circuits can be created for each of the pole contact tongues effective independently from each other.

While we have disclosed one embodiment of the present invention, it is to be understood that this embodiment is given by example only and not in a limiting sense.

We claim:
1. A lighting contrivance, comprising
a supporting rail adapted to be secured to a securing face and open towards one side defining a connection box receiving channel,
conduit rail carriers disposed on both sides in said supporting rail and each having a plurality of electrical conduit rails forming a plurality of independently operating current circuits, disposed in superposed position and accessible from the inside of said supporting rail and received in said conduit rail carrier inside of said supporting rail and on both sides of said receiving channel, in planes disposed in pairs and mirror-symmetrically to a longitudinal center plane extending from an insert side to a securing side of said rail carrier, three of said conduit rails constituting pole rails and one of said conduit rails constituting a zero-conduit rail, a connection box having a set-off head part insertable into said receiving channel of said supporting rail and carrying lamps, said connection box being equipped with a plurality of spring tongues, as well as with a grounding tongue, the latter cooperating with a particular grounding rail, said spring tongues constituting holding-tongues and contact-tongues switchable selectively by means of a first switch into an engagement-position and contact-position with one of said pole rails and zero-conduit rail, and into an inoperative position, respectively, switch elements mounted in said connection box for cross-wise movement therein, via said first switch, and said conduit tongues disposed in groups thereon, a preselection switch operatively disposed between said zero conduit rail and each contact tongue in said connection box on a side of said supporting rail for the selective formation of an operating current circuit, said preselection switch being disposed separately from said first switch as well as operationally independent from said first switch, and disposed switchable from outside of said supporting rail by means of a switching member accessible from the outside of said connection box, and said preselection switch being equipped with switch contact points of a number corresponding with the number of pole rails on the side of the supporting rail and each having an individual operative contact connection with one of said contact tongues, and a switch bridge on the inside of said connection box and movably connected to said switching member and selectively engageable with one of said switch contact points and connected with a light source by means of a current conduit, said light source being electrically and operatively disposed between said switch bridge and said zero conduit rail.

2. A lighting contrivance, comprising a supporting rail adapted to be secured to a securing face and open towards one side defining a connection box receiving channel, conduit rail carriers disposed in both sides in said supporting rail and each having a plurality of electrical conduit rails forming a plurality of independently operating current circuits, disposed in superposed position and accessible from the inside of said supporting rail and received in said conduit rail carrier inside of said supporting rail and on both sides of said receiving channel, in planes disposed in pairs and mirror-symmetrically to a longitudinal center plane extending from an insert side to a securing side of said rail carrier, three of said conduit rails constituting pole rails and one of said conduit rails constituting a zero-conduit rail, a connection box having a set-off head part insertable into said receiving channel of said supporting rail and carrying lamps, said connection box being equipped with a plurality of spring tongues, as well as with a grounding tongue, the latter cooperating with a particular grounding rail, said spring tongues constituting holding-tongues and contact-tongues switchable selectively by means of a first switch into an engagement-position and contact-position with one of said pole rails and zero-conduit rail, and into an inoperative position, respectively, switch elements mounted in said connection box for cross-wise movement therein, via said first switch, and said conduit tongues disposed in groups thereon, a preselection switch operatively disposed between said zero conduit rail and each contact tongue in said connection box on a side of said supporting rail for the selective formation of an operating current circuit, said preselection switch being disposed separately from said first switch as well as operationally independent from said first switch, and disposed switchable from outside of said supporting rail by means of a switching member accessible from the outside of said connection box, and said preselection switch being equipped with switch contact points of a number corresponding with the number of pole rails on the side of the supporting rail and each having an individual operative contact connection with one of said contact tongues, and a switch bridge on the inside of said connection box and connected with a light source by means of a current conduit, said light source being electrically and operatively disposed between said switch bridge and said zero conduit rail, two housing cups cooperatively forming said connection box, a guide holder disposed in one of said housing cups and said switch elements carrying said tongues being mounted in said guide holder for said cross-wise movement, said guide holder forming a socket of said preselection switch, switch stays constituting said switch contact points integrally mounted in said socket, a covering cap for said preselection switch disposed inside said connection box and said covering cap jointly with said guide holder is connected by two securing screws with one of said housing cups.

3. The lighting contrivance, as set forth in claim 2, wherein said guide holder has a bottom plate engaging one of said housing cups and projecting therefrom are three guide walls of a height corresponding substantially with the depth of said connection box, and said guide walls form in an opposite disposition one-sided open guide grooves for reception therein of guide ledges formed on the side of said switch elements.

4. The lighting contrivance, as set forth in claim 2, wherein said switch stays are received in a fan-like arrangement in said socket in groove-like cavities formed in said socket, and said cavities are separated from each other by upright separation stays which are rounded over parts of their length in a swinging movement range of the switch bridge and constituting a sliding formation for a contact end of said switch bridge.

5. The lighting contrivance, as set forth in claim 4, wherein said sliding formations of separation stays having curved apexs which are disposed in planes beyond planes of said switch stays.

6. A lighting contrivance, comprising a supporting rail adapted to be secured to a securing face and open towards one side defining a connection box receiving channel, conduit rail carriers disposed in both sides in said supporting rail and each having a plurality of electrical conduit rails forming a plurality of independently operating current circuits, disposed in superposed position and accessible from the inside of said supporting rail and received in said conduit rail carrier inside of said supporting rail and on both sides of said receiving channel, in planes disposed in pairs and mirror-symmetrically to a longitudinal center plane extending from an insert side to a securing side of said rail carrier, three of said conduit rails constituting pole rails and one of said conduit rails constituting a zero-conduit rail, a connection box having a set-off head part insertable into said receiving channel of said supporting rail and carrying lamps, said connection box being equipped with a plurality of spring tongues, as well as with a grounding tongue, the latter cooperating with a particular grounding rail, said spring tongues constituting holding-tongues and contact-tongues switchable selectively by means of a first switch into an engagement-position and contact-position with one of said pole rails and zero-conduit rail, and into an inoperative position, respectively, switch elements mounted in said connection box for cross-wise movement therein, via said first switch, and said conduit tongues disposed in groups thereon, a preselection switch operatively disposed between said zero conduit rail and each contact tongue in said connection box on a side of said supporting rail for the selective formation of an operating current circuit, said preselection switch being disposed separately from said first switch as well as operationally independent from said first switch, and disposed switchable from outside of said supporting rail by means of a switching member accessible from the outside of said connection box, and said preselection switch being equipped with switch contact points of a number corresponding with the number of pole rails on the side of the supporting rail and each having an individual operative contact connection with one of said contact tongues, and a switch bridge on the inside of said connection box and connected with a light source by means of a current conduit, said light source being electrically and operatively disposed between said switch bridge and said zero conduit rail, each of said switch elements if formed substantially as a fork-shaped body having a head part and a fork-shaped foot part, said head part has two open, slot-shaped insert openings, disposed adjacent to each other and extending in a longitudinal direction of said body, and receiving therein said contact tongues, and said head part has projecting stays receiving one of said holding tongues, and said first switch includes at least one control eccentric disposed on a switch shaft, and said foot part of said body straddles said control eccentric for operation of said switch elements.

7. The lighting contrivance, as set forth in claim 6, in which two of said switch elements are disposed in said connection box one after the other and displaceable in opposite directions by two opposite-acting of said control eccentrices which are axially spaced apart on said switch shaft.

* * * * *